Dec. 13, 1966  C. E. PALMER ETAL  3,290,888
SLUICE GATE

Filed May 23, 1963  2 Sheets-Sheet 1

Dec. 13, 1966  C. E. PALMER ETAL  3,290,888
SLUICE GATE

Filed May 23, 1963  2 Sheets-Sheet 2

INVENTORS
Charles E. Palmer
Robert H. Palmer
BY John A. Oldenberg

Charles L. Lovercheck
attorney

United States Patent Office 3,290,888
Patented Dec. 13, 1966

3,290,888
SLUICE GATE
Charles E. Palmer, Robert H. Palmer, and John A. Oldenburg, Lake City, Pa., assignors to Palmer Filter Equipment Company, Erie, Pa., a partnership firm
Filed May 23, 1963, Ser. No. 282,767
3 Claims. (Cl. 61—28)

This invention relates to valves and, more particularly, to the type of valves known as sluice gates.

The sluice gate arrangement disclosed herein was invented for the purpose of providing a positive sealing, nonleaking sluice gate. The sluice gate valve disclosed herein will also reduce maintenance costs to a minimum by eliminating all frictional wear to the gate closure surfaces during opening and closing caused by head pressure on the upstream side of the gate.

This invention provides a definite means of horizontal movement of the gate to and from sealing contact with the gate closure surface while also providing for the necessary vertical movement required to control flow or intermediate opening and closing of the gate. The design also eliminates the need of bronze contact sealing replacements which become worn due to frictional wear as well as adjustment and replacement of adjusting wedges heretofore in common use. Constant positive self-adjusting seal contact is maintained at the conclusion of the closing cycle by means of compression springs forcing the gate assembly against the sealing surface of the gate orifice frame.

It is, accordingly, an object of the present invention to provide an improved gate valve.

Another object of the invention is to provide a valve which has a mechanism to move it away from its seat prior to its movement from a closed to an open position.

A further object of the invention is to provide an improved sluice gate which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
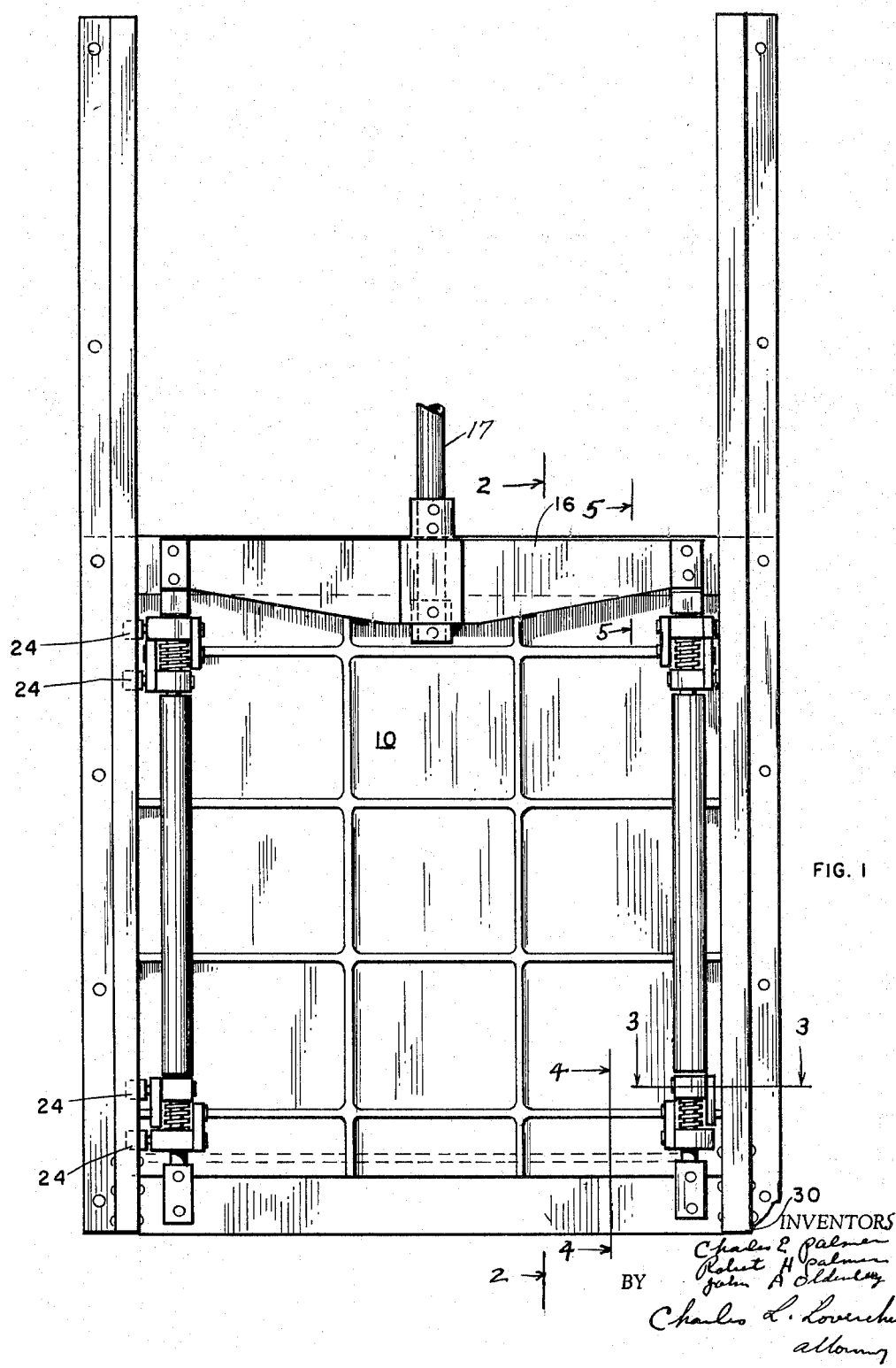
FIG. 1 is an elevational view of a gate, roller guide channels, and a gate orifice frame according to the invention as seen from the upstream side of the general assembly.
Figure 5:
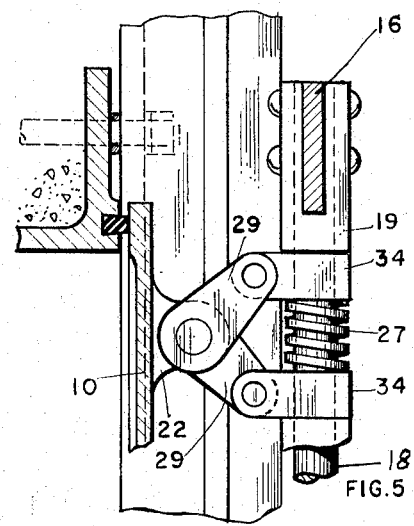
FIG. 5 is an enlarged partial cross sectional view taken on line 5—5 of FIG. 1 showing the upper part of FIG. 2.
Figure 2:
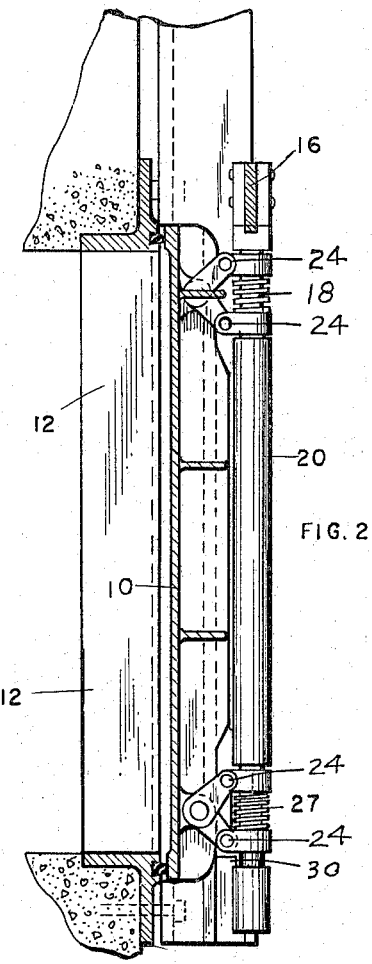
FIG. 2 is an enlarged partial cross sectional view taken on line 2—2 of FIG. 1.
Figure 4:
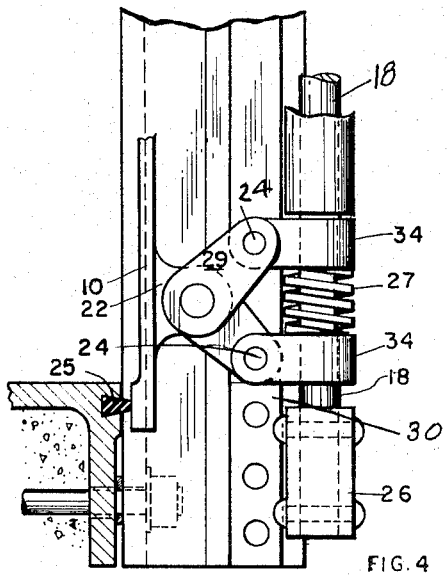
FIG. 4 is an enlarged partial cross sectional view taken on line 4—4 of FIG. 1 showing the lower part of FIG. 2.
Figure 3:
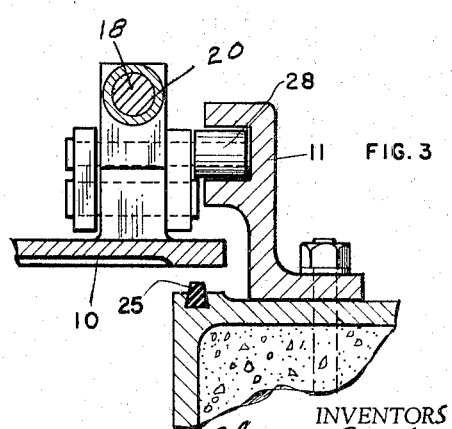
FIG. 3 is an enlarged partial cross sectional view taken on line 3—3 of FIG. 1.

Now with more particular reference to the drawings, the sluice gate disclosed herein is made up generally of a valve member 10, an orifice frame, and a mechanism to move the valve member toward and away from the frame before it is opened and after it is in closed position to thereby eliminate wear and reduce the effort necessary to operate the gate. The gate valve member 10 is supported over the opening in the orifice frame and is guided up and down in channels 11.

In the operation of the gate valve member 10, mechanical effort is applied to a master operating shaft 17 by manual, hydraulic, or electrical operation of standard devices designed to raise or lower the valve member 10. This effort is, in turn, transmitted to a gate operating truss 16 and hence to gate linkage operating rods 18 which are attached to the truss 16 at the upper ends thereof. Lifting collars 26 are attached at the lower ends of the operating rods 18. The rods 18 receive upper and lower spacer sleeves 34, a spring 27, a central pressure sleeve 20, and a bottom lifting collar 26.

Links 29 are assembled to the above mentioned components of the operating rod assembly by means of pins 24 which also serve as the bearing shaft for channel rollers 28. The links 29 are, in turn, attached to a gate boss in the form of lugs 22 which are an integral part of the valve member 10.

The roller guide channels 11 are properly positioned and aligned at each side of the gate valve member 10. The channels 11 are attached to both a gate orifice frame 12 and the basin wall by means of mounting bolts 15 and spacer washers 14.

In the general opening cycle, the lifting effort applied to the master operating shaft 17 raises the entire gate assembly so as to clear, or partially clear, the upper edge of the gate orifice frame 12. The degree of opening depends upon the required flow of water or solution required by components served by the gate. Since, in all normal operations of the gate, there is a constant pressure head against the upstream side of the gate causing excessive friction between the contact surfaces of the gate and the gate orifice frame, this invention provides the means of removing this friction as set forth below.

When downward pressure is released from the master operating shaft 17, the expansion springs 27 immediately begin forcing the links 29 apart. This motion is then transferred to the valve member 10 through the links 29, causing the valve member 10 to be horizontally withdrawn from contact with a seal 25. When all pressure is removed from the shaft 17, the springs 27 have caused complete horizontal clearance at all points between all surfaces of the valve member 10 and the seal 25.

During the gate withdrawal cycle aforementioned, the upstream pressure against the gate is transferred by the action of the springs 27 to the rollers 28 positioned in the roller channels 11. As more upward effort is applied to the shaft 17, the entire gate assembly begins to rise with the rollers 28 moving in the channels 11 acting as the guides to maintain alignment during the operational cycle.

Since the rollers 28 are free to rotate on the link yoke pins 24 and within the channels 11, the friction caused by the upstream pressure on the valve member 10 is reduced to a minimum since there is no longer any contact friction between the valve member 10 and the seal 25 or the gate orifice frame 12.

When the closing of the valve member 10 is required, downward pressure is applied to the shaft 17. This, in turn, reacts on the gate operating truss 16 and through the gate linkage operating rods 18. As soon as the gate assembly reaches the proper horizontal alignment with the gate orifice frame 12, the bottom roller 28 contacts a channel roller stop 30.

When the roller 28 contacts the stop 30, all further downward movement of the gate assembly ceases. Continued effort, however, applied through the shaft 17 and transmitted to the rods 18 forces the rods to slide through the link yoke pins 24 and the central pressure sleeve 20. Since the bottommost link pins 24 are stopped by the rollers 28 contacting the stop 30 in the channels 11, the closing effort is then transferred to the springs 27.

As the closing effort is applied to the springs 27 through the rods 18 and an upper pressure sleeve 19, links 29, and central pressure sleeve 20, the springs 27 are compressed. The closing effort is again transmitted in a horizontal direction through the links 29 to the valve member 10. This moves the valve member 10 into sealing contact with the seal 25. Further applied effort effects a perfect closure and sealing between the surface of the valve member 10 and seal 25 inserted in or attached to the gate orifice frame 12.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A sluice gate comprising
 a gate orifice frame,
 said gate orifice frame being angular in cross section and having a leg of said angular cross section extending around said frame adapted to be disposed on the upstream side thereof defining an opening,
 sealing means on said frame,
 a guide channel at each side of said frame,
 rollers movable in said channels,
 a gate,
 means to move said gate up and down and toward and away from said sealing means,
 said moving means comprising linkage operating rods extending generally parallel to said gate,
 an operating truss extending from one side of said gate to the other and having means thereon slidably receiving one end of said rods,
 a lower pair of spaced sleeves on each said rod with a spring therebetween,
 an upper pair of sleeves on each said rod with a spring therebetween,
 an elongated sleeve on each said rod disposed between said pairs of springs thereon,
 stop means on the lower end of each said rod, limiting the downward movement of said lower pair of springs,
 laterally spaced gate mounting lugs on one side of said gate,
 and pairs of links,
 one end of each link of each said pair of links being pivoted to each said lug,
 the second end of each said link being pivoted to one said sleeve,
 one of said rollers being rotatably attached to each said sleeve,
 each said roller being rotatably received in a said channel.

2. A sluice gate comprising
 a frame,
 a channel in each side of said frame with the openings in said channels facing each other,
 a sealing member around said frame,
 a gate,
 said gate having vertically and laterally spaced lugs thereon,
 a pair of links at each said lug having one end of each link of each said pair swingably attached to the lug adjacent thereto on an axle,
 an operating truss having a rod at each side thereof extending parallel to said channels,
 a roller attached to each distal end of said links and disposed in one said channel,
 a sleeve attached to each said roller and slidably receiving a said rod,
 a spring between said sleeves,
 said sleeves being disposed on said rods,
 and means between two adjacent said sleeves on each said rod for urging them to compress said spring, moving them together and moving said gate into sealing engagement with said sealing member when said gate is in an operative position.

3. A sluice gate comprising
 a frame defining a gate orifice,
 a gate mounted on the downstream side of said frame,
 means to move said gate out of the path of flow of fluid through said frame and into said flow path and in spaced relation thereto and to move said gate into sealing engagement with said frame,
 said means comprising two spaced channels, one attached to each side of said frame,
 horizontally and vertically spaced lugs on said gate,
 pairs of links,
 the links of each said pair having one end attached to one of said lugs,
 two spaced, parallel operating rods extending parallel to said channels and adjacent thereto,
 a central pressure sleeve on each said rod,
 a pair of two spaced spacer sleeves on each said rod on each end of said pressure sleeve,
 a compression spring between each two sleeves of each said pair urging said sleeves apart,
 each link of each said pair being swingably attached to one said lug at one end and to one of said spacer sleeves at the other end,
 a stop on said frame engaging the bottom-most said spacer sleeve on each said rod when said rods are pushed downwardly,
 an operating member attached to the upper ends of said operating rods engaging the uppermost said spacer sleeve when said gate is moved to closed position,
 said spacer sleeves being forced toward each other when said operating member is urged downwardly whereby said links move toward a position more nearly parallel to each other whereby said gate is forced to closed position,
 and rollers in said channels,
 one said roller being attached to the pivot points of connection of each said link to a said sleeve whereby a force is exerted between said channels and said sleeves when said operating member is moved downwardly and said gate is moved into engagement with said frame.

References Cited by the Examiner

UNITED STATES PATENTS

| | | | |
|---|---|---|---|
| 771,959 | 10/1904 | Adams | 61—28 |
| 894,240 | 7/1908 | Taylor | 61—28 |
| 1,492,482 | 4/1924 | Roots | 61—28 X |

FOREIGN PATENTS 367,129  2/1932  Great Britain.

EARL J. WITMER, *Primary Examiner.*